(12) United States Patent
Lütjen et al.

(10) Patent No.: US 10,711,767 B2
(45) Date of Patent: Jul. 14, 2020

(54) METHOD AND SYSTEM FOR THE MAINTENANCE OF A WIND ENERGY INSTALLATION FROM A GROUP OF WIND ENERGY INSTALLATIONS

(71) Applicant: Senvion GmbH, Hamburg (DE)

(72) Inventors: Jan Lütjen, Lütjenwestedt (DE); Dennis Thiessen, Österröfeld (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 16/293,821

(22) Filed: Mar. 6, 2019

(65) Prior Publication Data
US 2019/0277261 A1 Sep. 12, 2019

(30) Foreign Application Priority Data
Mar. 6, 2018 (DE) .................. 10 2018 001 763

(51) Int. Cl.
*F03D 80/50* (2016.01)
*F03D 9/25* (2016.01)
*F03D 7/02* (2006.01)
*F03D 7/04* (2006.01)
*H02J 3/38* (2006.01)

(52) U.S. Cl.
CPC ............ *F03D 80/50* (2016.05); *F03D 7/028* (2013.01); *F03D 7/048* (2013.01); *F03D 9/257* (2017.02); *H02J 3/386* (2013.01); *F05B 2230/80* (2013.01); *F05B 2260/80* (2013.01); *F05B 2260/8211* (2013.01); *F05B 2270/1033* (2013.01)

(58) Field of Classification Search
USPC ................................ 290/43, 44, 55; 700/287
See application file for complete search history.

(56) References Cited

U.S. PATENT DOCUMENTS

| | | | |
|---|---|---|---|
| 7,071,579 B2* | 7/2006 | Erdman | F03D 7/0284 290/44 |
| 7,298,059 B2* | 11/2007 | Delmerico | F03D 7/028 307/85 |
| 7,484,363 B2* | 2/2009 | Reidy | F03D 9/257 60/398 |
| 7,840,312 B2* | 11/2010 | Altemark | F03D 7/043 290/44 |

(Continued)

FOREIGN PATENT DOCUMENTS

WO 2014191067 A1 12/2014

*Primary Examiner* — Pedro J Cuevas
(74) *Attorney, Agent, or Firm* — Alix, Yale & Ristas, LLP

(57) ABSTRACT

A method for the maintenance of a first wind energy installation from a group of wind energy installations. In the method, a future maintenance time period is identified in which a boost power of the group of wind energy installations is greater than a prescribed threshold value, wherein the boost power results from a wind speed predicted for the future maintenance time period, said wind speed being greater than a rated wind speed. The power of the first wind energy installation is reduced after the start of the maintenance time period and a boost power is drawn from a plurality of wind energy installations from the group of wind energy installations. A maintenance process is carried out at the first wind energy installation. The invention furthermore relates to a control unit suitable for carrying out the method.

12 Claims, 4 Drawing Sheets

(56) References Cited

U.S. PATENT DOCUMENTS

| | | | | |
|---|---|---|---|---|
| 7,999,406 B2* | 8/2011 | Cardinal | ............... | F03D 7/0284 290/44 |
| 8,046,110 B2* | 10/2011 | Mayor | ................. | F03D 7/0284 290/44 |
| 8,283,803 B2* | 10/2012 | Fortmann | ............... | H02J 3/383 290/44 |
| 8,718,832 B2* | 5/2014 | Hashimoto | ........... | F03D 7/0284 290/44 |
| 8,853,877 B1* | 10/2014 | Zalar | ...................... | F03D 7/048 290/44 |
| 8,946,916 B2* | 2/2015 | Tarnowski | ............ | F03D 7/0276 290/44 |
| 8,963,353 B1* | 2/2015 | Ekanayake | ............... | H02J 3/32 290/43 |
| 9,127,642 B2* | 9/2015 | Zhu | ....................... | F03D 7/0288 |
| 9,644,612 B2* | 5/2017 | Evans | ...................... | H02J 3/00 |
| 9,822,762 B2* | 11/2017 | Kooijman | ................. | F03D 7/02 |
| 10,100,813 B2* | 10/2018 | Ravindra | .................. | F03D 7/048 |
| 10,193,481 B2* | 1/2019 | Tarnowski | .............. | F03D 7/0276 |
| 10,418,925 B2* | 9/2019 | Tarnowski | ............... | H02P 9/107 |
| 10,422,319 B2* | 9/2019 | Spruce | .................... | F03D 17/00 |
| 10,439,394 B2* | 10/2019 | Trudel | ...................... | H02J 3/14 |
| 10,454,277 B2* | 10/2019 | Koeppe | .............. | H02J 13/0086 |
| 2007/0047163 A1* | 3/2007 | Lutze | ................... | F03D 7/0284 361/78 |
| 2009/0055030 A1* | 2/2009 | Mayor | .................. | F03D 7/0284 700/287 |
| 2011/0046803 A1* | 2/2011 | Kondo | ................. | F03D 7/0272 700/287 |
| 2011/0144816 A1* | 6/2011 | Morjaria | ................. | F03D 9/257 700/287 |
| 2012/0161444 A1* | 6/2012 | Tarnowski | ............ | F03D 7/0276 290/44 |
| 2013/0166082 A1* | 6/2013 | Ambekar | ............... | G05B 13/04 700/287 |
| 2013/0320674 A1* | 12/2013 | Ingram | ..................... | H02P 9/04 290/43 |
| 2014/0015252 A1* | 1/2014 | Zhu | ....................... | F03D 7/0288 290/44 |
| 2014/0248123 A1* | 9/2014 | Turner | .................... | F03D 7/043 415/1 |
| 2014/0252855 A1* | 9/2014 | Watanabe | ................. | H02J 3/00 307/31 |
| 2014/0288855 A1* | 9/2014 | Deshpande | ............. | F03D 17/00 702/34 |
| 2015/0076821 A1* | 3/2015 | Ekanayake | ............... | H02J 3/46 290/43 |
| 2015/0084338 A1* | 3/2015 | Tarnowski | ............ | F03D 7/0276 290/44 |
| 2015/0167637 A1* | 6/2015 | Kooijman | ................. | F03D 7/02 416/1 |
| 2015/0244172 A1* | 8/2015 | Trudel | .................... | G01R 31/42 307/129 |
| 2016/0190866 A1* | 6/2016 | Pelletier | .................. | B60L 53/63 307/64 |
| 2017/0358929 A1* | 12/2017 | Koeppe | ............... | H02J 13/0096 |
| 2018/0171978 A1* | 6/2018 | Spruce | ..................... | G05B 9/02 |
| 2018/0187648 A1* | 7/2018 | Spruce | .................... | F03D 7/028 |
| 2018/0187650 A1* | 7/2018 | Byreddy | ................ | F03D 7/0292 |
| 2018/0223808 A1* | 8/2018 | Spruce | .................... | F03D 7/0292 |
| 2019/0109552 A1* | 4/2019 | Tarnowski | ............ | F03D 7/0276 |
| 2020/0006947 A1* | 1/2020 | Koeppe | ...................... | H02J 3/46 |
| 2020/0052487 A1* | 2/2020 | Trudel | .................... | G01R 31/42 |
| 2020/0056588 A1* | 2/2020 | Nielsen | ................ | F03D 7/0292 |

\* cited by examiner

METHOD AND SYSTEM FOR THE MAINTENANCE OF A WIND ENERGY INSTALLATION FROM A GROUP OF WIND ENERGY INSTALLATIONS

BACKGROUND

The invention relates to a method and to a system for the maintenance of a first wind energy installation from a group of wind energy installations.

In order to be able to carry out a maintenance process at a wind energy installation, it is necessary in many cases to shut down the wind energy installation or at least to operate said wind energy installation with reduced power. The losses in yield associated therewith are undesirable.

It is known to select a time period with weak wind for the maintenance process. The losses in yield produced owing to the standstill of a wind energy installation are then lower than if the standstill falls within a period of strong wind (WO 2014/191067 A1). This procedure has the disadvantage that the flexibility when planning maintenance processes is significantly restricted.

SUMMARY OF THE INVENTION

The invention is based on the object of presenting a maintenance method and a maintenance system that make it possible to achieve greater flexibility when planning maintenance processes, wherein high losses in yield are avoided. Proceeding from the known prior art, the object is achieved by way of the features of the independent claims. Advantageous embodiments are specified in the dependent claims.

In the maintenance method according to the invention for the maintenance of a first wind energy installation from a group of wind energy installations, a future maintenance time period is identified in which a boost power of the group of wind energy installations is greater than a prescribed threshold value, wherein the boost power results from a wind speed predicted for the future maintenance time period, said wind speed being greater than a rated wind speed. After the start of the maintenance time period, the power of the first wind energy installation is reduced and a boost power is drawn from a plurality of wind energy installations from the group of wind energy installations. Maintenance is carried out at the first wind energy installation.

The invention branches off from the concept of planning the maintenance so that the power loss at the wind energy installation affected by the maintenance is kept as low as possible and, in contrast, where necessary even accepts the fact that the power loss at this wind energy installation is higher than necessary. This intrinsically avoidable power loss at the wind energy installation to undergo maintenance can be accepted according to the invention when other wind energy installations can provide a boost power at the same time. The boost power can be used to at least partly and where necessary completely compensate for the power loss as a result of the maintenance.

Boost power refers to that proportion of the electrical power output by the wind energy installation that exceeds the rated power. For example, if a wind energy installation has a rated power of 3.0 MW, but actually outputs 3.1 MW at a specific time, the boost power is 0.1 MW.

The maximum output power for which a wind energy installation during normal operation under standardized conditions is permanently designed, is referred to as the rated power, cf. IEC standard 61400. It is known that a wind energy installation can output a boost power that exceeds the rated power in the presence of specific conditions for a limited time period (WO 2012/041326 A2). Reference is made to this document for more detailed explanations as to how and under which conditions a boost power can be drawn from a wind energy installation.

The method according to the invention is based on a forecast about a boost power available in the future. The ability of a wind energy installation to provide a boost power depends directly on the wind speed. The lowest wind speed from which the wind energy installation can output its rated power is referred to as the rated wind speed. A necessary prerequisite for the output of a boost power is a wind speed that is greater than the rated wind speed.

A definitive statement about the wind speed in a future time period is not possible; one has to rely on forecasts. During the operation of wind energy installations, it is usually necessary to operate using forecasts for the wind conditions. If it is identified according to the invention whether a wind energy installation can provide a boost power in a future time period, this means that the wind speed predicted by a forecast for the future time period is compared with the rated wind speed. If the predicted wind speed is less than or equal to the rated wind speed, the wind energy installation cannot provide a boost power. If the predicted wind speed is greater than the rated wind speed, a boost power can be provided by the wind energy installation.

It is known from the characteristic curve of a wind energy installation what power can be drawn from the wind energy installation at which wind speed. From a wind speed above the rated wind speed, it is therefore possible to directly derive a specific value for the boost power that a wind energy installation can provide. If a wind speed of more than the rated wind speed is present in the case of a plurality of wind energy installations, the boost power of the group of wind energy installations results as the sum of the boost powers of the individual wind energy installations. It is not necessary for the wind speed at all of the wind energy installations of the group to be higher than the rated wind speed. If individual wind energy installations output less than the rated power, the boost power of the group of wind energy installations is not reduced as a result thereof.

If a future time period in which the boost power is greater than the prescribed threshold value results based on the wind forecast, said time period can be selected as the maintenance time period. Maintenance time period means that a maintenance process can be scheduled at the first wind energy installation for this time period.

When the future maintenance time period is selected, as well as the wind speed, further parameters that can influence the loading of the wind energy installations in which boost power is available can be taken into account. These parameters can include, for example, the predicted wind turbulence, a vertical and/or horizontal wind gradient, an upflow, the wake conditions in the group of wind energy installations and/or the air density. Using the example of wind turbulence, the wind energy installations are generally loaded to a lesser degree in a period with a lower wind turbulence than in periods with a higher wind turbulence. There are corresponding relationships in the other mentioned wind parameters. The method can be carried out so that the boost power is only drawn when the other loading (for example due to wind turbulence) is not high.

In the context of the present invention, the term maintenance is to be understood to mean that it includes all work on a wind energy installation that can be carried out in a plannable manner in a future time period, wherein the wind energy installation can remain in operation up to the future time period. Typical maintenance work requires that the power output by the wind energy installation is at least reduced with respect to the rated power. In many cases, the wind energy installation is brought to a standstill after the start of the maintenance time period and before the start of the maintenance process so that the output power is reduced to zero.

Work that has to be carried out immediately, for example after a failure of a component of the wind energy installation, is not maintenance in this context because it is not possible to keep such an installation running up to occurrence of the future maintenance time period. Maintenance includes, for example, work that is to be carried out at repeated intervals, such as the replacement of worn parts or the exchange of lubricants. The term maintenance also includes inspections, by way of which the state of a specific component of the wind energy installation is identified. Also included is repair work that is delayed until the occurrence of a maintenance time period. An example of this could be the fact that a condition monitoring system (CMS) indicates that a transmission bearing of the wind energy installation has an expected lifetime of only another six months. A maintenance time period that results after, for example, four months can be used to replace the transmission bearing.

The maintenance time period identified based on a wind forecast is initially in the future. The period of time between the identification of the future maintenance time period and the occurrence of the maintenance time period can be used to create a maintenance plan, which determines a maintenance process to be carried out in the future maintenance time period for the first wind energy installation. The maintenance work provided according to the maintenance plan is carried out at the first wind energy installation after the start of the maintenance time period.

It is advantageous for the method according to the invention when a sufficient amount of boost power is available for the entire duration of the maintenance process. For this reason, it is possible to identify a future maintenance time period that is longer than the duration of the maintenance process to be carried out at the first wind energy installation, wherein the boost power over the entire duration of the maintenance time period is greater than the prescribed threshold value.

Within the scope of the method according to the invention, a maintenance time period that is shorter than the duration of the maintenance process or a maintenance time period in which, although it is as long as the duration of the maintenance process, there is a boost power that is not greater than the prescribed threshold value over the entire duration of the maintenance time period, may also be acceptable. In both cases, the maintenance time period can be selected so that the boost power is greater than the prescribed threshold value over at least 40%, preferably at least 60%, further preferably over at least 80% of the duration of the maintenance process.

According to the method according to the invention, the boost power is used to at least partly compensate for the power loss resulting from the maintenance process at the first wind energy installation. The prescribed threshold value for the boost power can be related to the power loss to be expected at the first wind energy installation. For example, the prescribed threshold value can be selected so that the power loss to be expected at the first wind energy installation can be compensated to an extent of at least 40%, preferably to an extent of at least 80%, further preferably to an extent of at least 100%.

When the wind speed predicted for the future maintenance time period for the location of the first wind energy installation is at least as great as the rated wind speed of the first wind energy installation, the power loss to be expected corresponds to the rated power of the first wind energy installation if the first wind energy installation is shut down for the maintenance process. If the maintenance process is carried out with decreased power of the first wind energy installation, the power loss to be expected reduces accordingly.

Compensating for the power loss to be expected by boost power can be made easier by selecting a future maintenance time period at which a wind speed that is lower than the rated wind speed of the first wind energy installation is predicted for the location of the first wind energy installation. For example, a future maintenance time period in which the power loss to be expected is lower than 100%, preferably is lower than 80%, of the rated power of the first wind energy installation can be selected. This will primarily come into consideration when the first wind energy installation is at a greater physical distance from other wind energy installations of the group. It is also possible that, in the group of wind energy installations, there are machines that have a lower rated wind speed than the first wind energy installation or that better wind conditions generally prevail at some locations of the group of wind energy installations than at the location of the first wind energy installation.

The method according to the invention can be carried out using a group of wind energy installations that are connected to a transmission network of a network operator via the same network infeed point. The electrical power can be transmitted from individual wind energy installations of the group up to the network infeed point by means of a network inside a wind farm. Wind energy installations that are connected to a common network infeed point are normally arranged in spatial proximity to one another. Due to the wind conditions predicted for the future maintenance time period, the wind energy installations of the group are in many cases affected in a similar manner. If the predicted wind speed is so high that one or more wind energy installations of the group can provide a boost power, the power loss at the first wind energy installation will often correspond to the rated power of the first wind energy installation.

In an alternative embodiment, the method can be carried out so that the first wind energy installation is connected to a transmission network of a network operator via a first network infeed point and that the group comprises wind energy installations that are connected to a transmission network of a network provider via a second network infeed point different from said first network infeed point. It is possible for all of the wind energy installations of the group apart from the first wind energy installation to be connected to the transmission network via the second network infeed point. It is also possible for some of the wind energy installations of the group to be connected to the transmission network via the first network infeed point together with the first wind energy installation.

When feeding in via a plurality of network infeed points, the wind energy installations of the group are often at a greater physical distance from one another. For example, it is possible for the wind speed at the wind energy installations connected to the first network infeed point to be lower than the rated wind speed and for the wind speed at the wind energy installations connected to the second network infeed point to be greater than the rated wind speed. Boost power can then be provided only via the second network infeed point. The second network infeed point can be designed so that the permissible power that can be fed in via the second network infeed point is greater by an excess power than the sum of the rated powers of the wind energy installations connected to the second network infeed point. Only under this condition is it possible to provide a boost power that exceeds the sum of the rated powers. The excess power may be greater than the power loss to be expected at the first wind energy installation owing to the maintenance process. In one embodiment, the excess power is greater than the rated power of the first wind energy installation.

In one embodiment, the first wind energy installation is connected to the first network infeed point and the group of wind energy installations comprises overall more than two network infeed points, for example at least 3, preferably at least 5, further preferably at least 10 network infeed points. The sum of the excess powers possible at the other network infeed points (except for the first network infeed point) may be greater than the power loss to be expected at the first wind energy installation owing to the maintenance process, in particular may be greater than the rated power of the first wind energy installation.

The group of wind energy installations can comprise at least 10, preferably at least 50, further preferably at least 200 wind energy installations. The method can be carried out so that at least 5, preferably at least 10, further preferably at least 20 wind energy installations provide boost power in the maintenance time period. The available boost power can be drawn in full or in part.

If boost power is drawn from a wind energy installation, this can have a disadvantageous effect on the remaining lifetime of the wind energy installation to be expected. Wind energy installations can be designed, for example, for a total lifetime (for example 20 years), of which a proportion (for example 40%) is assumed to be operation at rated power. The wind energy installation can have an operating time counter, which detects various parameters of the operation of the wind energy installation. These can include, for example, the total operating time, the proportion of the operating time under rated power, the number of start processes, the number of emergency stop processes and similar. The output of boost power can likewise be recorded. In order to be able to provide a simple statement about the remaining runtime of the wind energy installation to be expected, the operation under boost power can be offset against other parameters in a suitable manner. It can be assumed, for example, that the loading due to the output of boost power corresponds to a specific period of time under rated power. The count value that counts the rated power output thus far can be increased accordingly. In this case, a suitable conversion factor can be taken as a basis. For example, 1 hour output of boost power can be converted to 10 hours operation under rated power.

The rated power of a wind energy installation is defined with reference to specific standard conditions. The standard conditions can include, apart from the wind speed, other environmental conditions such as, for example, a wind turbulence or an air density. Environmental conditions in which, although it outputs rated power, the wind energy installation is still loaded to a lesser extent than would be the case under standard conditions are conceivable. The reason for this may be, for example, that the wind turbulence is assumed to be lower than in the standard conditions. In such a period, a wind energy installation can output boost power without this having to be offset against an overproportional reduction in the expected lifetime. In other words, the boost power is within a measurement range of the design. It is advantageous for the method according to the invention when the boost power is drawn in the maintenance time period from one or more wind energy installations within the measurement range of the design.

The invention also relates to a control unit for carrying out a maintenance process in a first wind energy installation from a group of wind energy installations. The control unit identifies, based on a wind prediction, a future maintenance time period in which a boost power of the group of wind energy installations is greater than a prescribed threshold value. The control unit is designed to generate a control signal after the start of the maintenance time period in order to reduce the power of the first wind energy installation and to draw a boost power from a plurality of wind energy installations from the group of wind energy installations.

The invention also relates to a system, comprising a group of wind energy installations, a forecast module for providing prediction data for the wind conditions and a control unit of this type. The components of the system are designed to work together according to the invention. The control unit can be upgraded with further features that are described in the context of the method according to the invention. The method can be upgraded with further features that are described in the context of the control unit according to the invention.

BRIEF DESCRIPTION OF THE DRAWINGS

The invention is described by way of example in the following text with reference to the appended drawings based on advantageous embodiments. In the figures.

DETAILED DESCRIPTION

Figure 1:
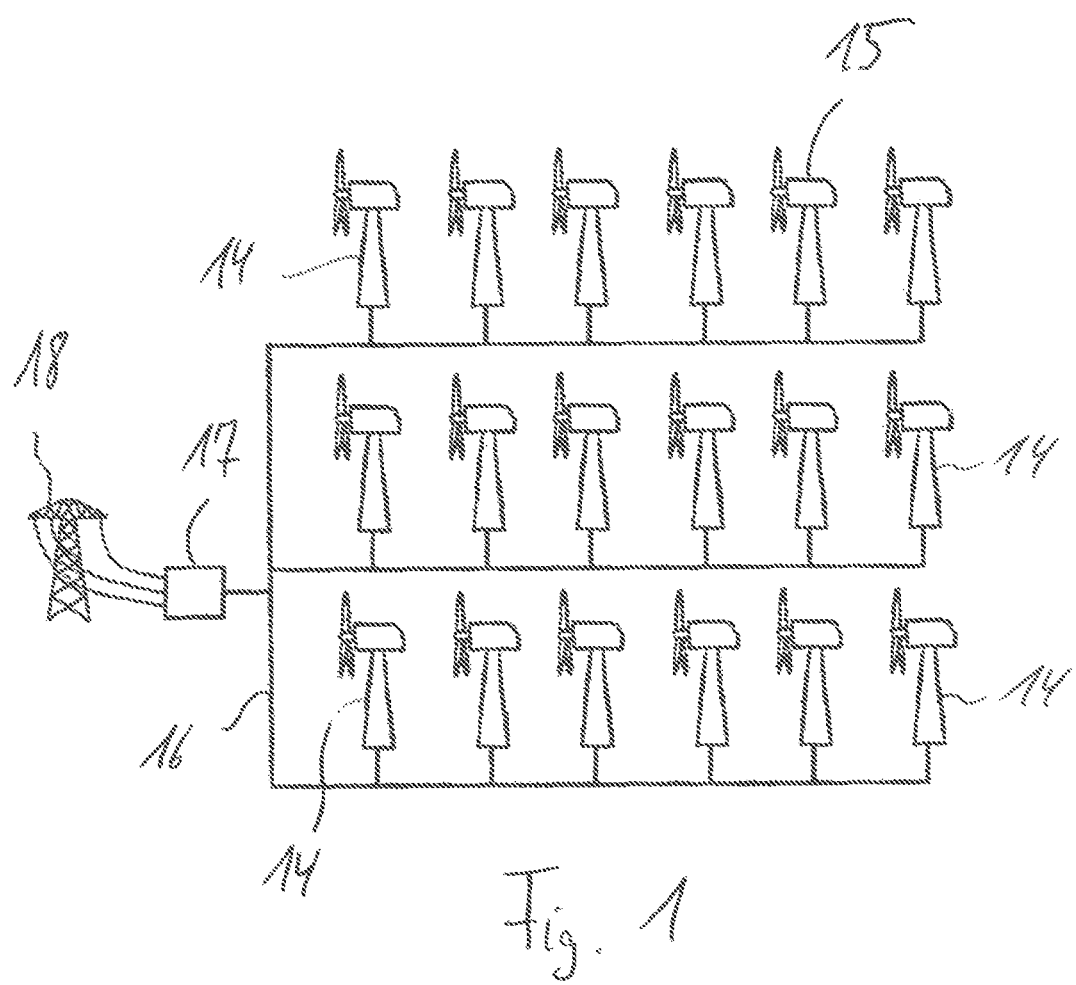
FIG. 1 shows a group of wind energy installations in a first embodiment of the invention.

FIG. 1 illustrates a group of wind energy installations 14, 15. Each wind energy installation comprises a generator, which is connected to a rotor by means of a rotor shaft. The rotor, which is set in rotation by the wind, drives the generator so that electrical energy is provided.

The group comprises a first wind energy installation 15, at which a cycle-based maintenance process is pending. The wind energy installations 14, 15 are connected to a network 16 inside a wind farm. The electrical energy provided by the wind energy installations 14, 15 is fed into a transmission network 18 at a network infeed point 17.

Figure 6:
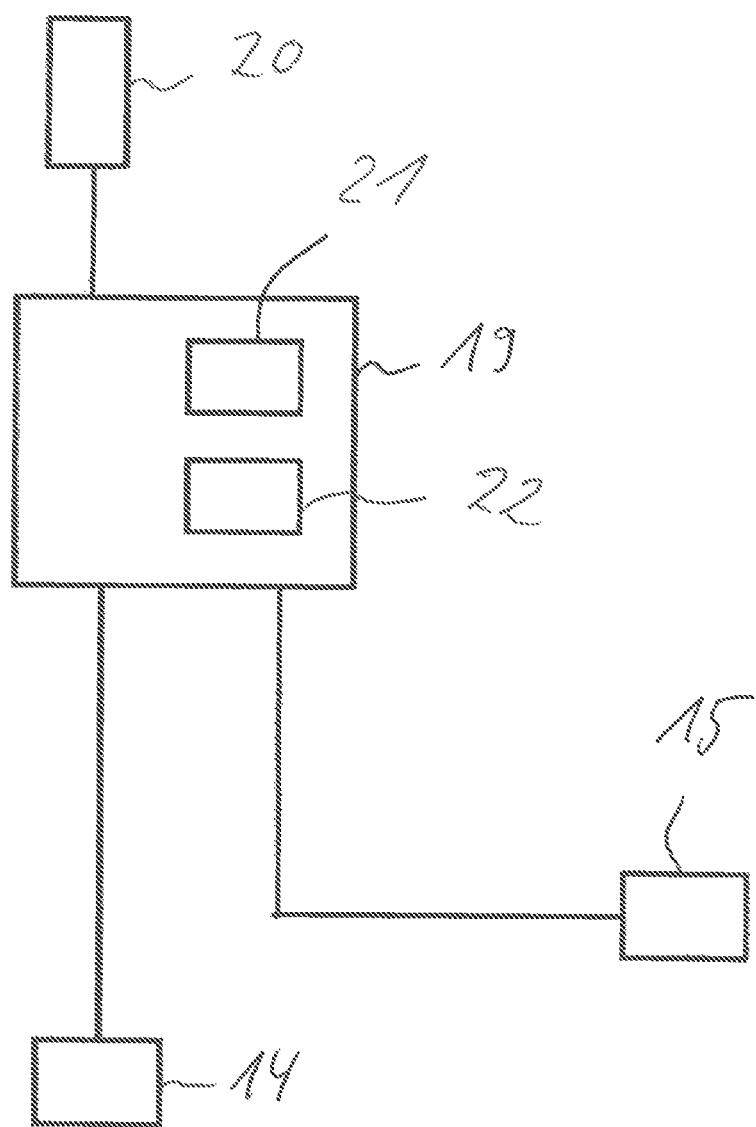
FIG. 6 shows a schematic illustration of a system according to the invention.

A system according to the invention comprises, according to FIG. 6, a control unit 19, which receives a prediction about the wind conditions at a future time from a forecast module 20. A computation module 21 of the control unit 19 processes the prediction data obtained from the forecast module 20 and first of all checks whether there is a future time period in which the predicted wind speed is greater than the rated wind speed of the wind energy installations 14. For the sake of simplicity, it is assumed that the same wind forecast applies to all of the wind energy installations 14 and that all of the wind energy installations 14 have the same rated wind speed. If this is not the case, separate wind forecasts have to be used and compared individually with the rated wind speeds of the wind energy installations 14.

If the computation module 21 has identified such a future time period, the amount of boost power that the wind energy installation 14 will probably be able to generate in the future time period is calculated in a next step for each wind energy installation 14. A total boost power of the group of wind energy installations results from the sum of the individual boost powers of the individual wind energy installations 14. Said total boost power of the group of wind energy installations is referred to as boost power within the scope of the invention.

The total boost power is compared with a prescribed threshold value. If the total boost power is greater than the prescribed threshold value, the computation module 21 in a next step checks the length of the time period until the total boost power drops below the prescribed threshold value again. To this end, the prediction data for the immediately subsequent time period are evaluated.

If the length of the time period is certain, the data about the start of the future time period, the end of the future time period and the amount of total boost power presumably available in the future time period are sent to a planning module 22. The planning module 22 compares the length of the future time period with the period of time necessary for carrying out the maintenance process at the first wind energy installation 15. If the future time period in which the boost power above the prescribed threshold value is available is longer than the period of time necessary for the maintenance process, the planning module 22 determines the future time period as a maintenance time period 26.

Figure 2:
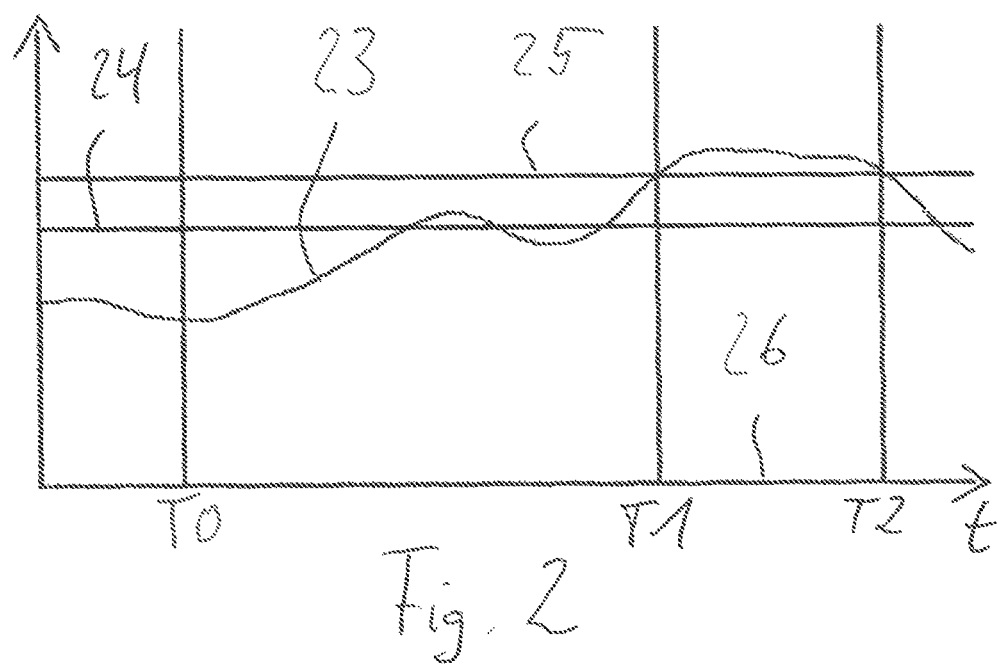
FIG. 2 shows a schematic illustration of a future maintenance time period.

In FIG. 2, the wind speed 23 is plotted against the time t. The current time is denoted as T0. The data before the time T0 are measured data of the actual wind speed. The data after the time T0 correspond to the prediction data of the forecast module 20. Before the time T0, the actual wind speed 23 was continuously lower than the rated wind speed 24. According to the prediction data, after the time T0, a rise in the wind speed 23 is to be expected, by which the rated wind speed 24 is briefly exceeded. After a brief drop below the rated wind speed 24, the wind speed according to the prediction data rises above the rated wind speed 24 for a longer time period.

At the time T1, for the first time the wind speed 23 is greater than a threshold value 25 from which the boost power of the group of wind energy installations identified using the computation module 21 is greater than the rated power of the wind energy installation 15. The threshold value 25 corresponds to the prescribed threshold value for the boost power. According to the prediction data, the time period in which the boost power is greater than the prescribed threshold value ends at the time T2.

The planning module 22 determines that the time period between the times T1 and T2 is longer than the time period necessary for the maintenance process at the wind energy installation 15 or that the period of time necessary for the maintenance process can be covered at least to a sufficient proportion. The time period is determined as the maintenance time period 26.

At the start of the maintenance time period 26, the control unit 19 sends a control command to the first wind energy installation 15, according to which control command the wind energy installation 15 is powered down and brought to a standstill. At the same time, a control signal goes to the other wind energy installations 14 of the group, according to which control signal the wind energy installations 14 increase the output power beyond the rated power. The resulting boost power of the wind energy installations 14 corresponds precisely to the power loss resulting from the standstill of the first wind energy installation 15.

In the maintenance time period 26, a service engineer located on site at the first wind energy installation 15 can carry out the cycle-based maintenance process. The maintenance process is concluded before the time T2. The service engineer sends a message about the conclusion of the maintenance process to the control unit 19. The control unit 19 sends a control signal to the first wind energy installation 15 to start operation again. In return for the electrical power fed in from the first wind energy installation 15, the boost power of the wind energy installations 14 is reduced until all of the wind energy installations 14, 15 have returned back to normal operation.

Figure 3:
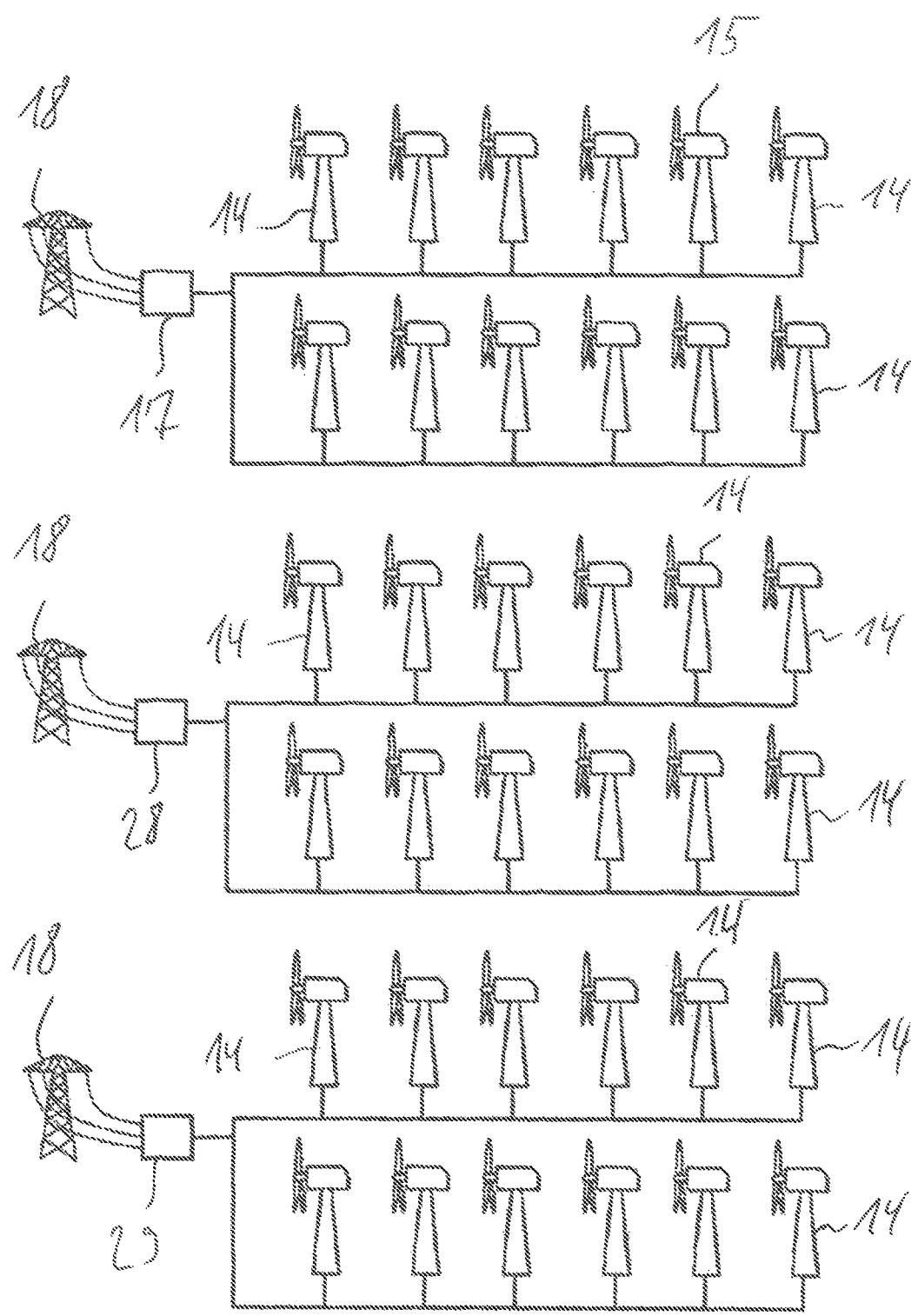
FIG. 3 shows a group of wind energy installations in a second embodiment of the invention.

FIG. 3 illustrates an embodiment in which the wind energy installations 14, 15 feed their electrical energy into the transmission network 18 via various network infeed points 17, 28, 29. The network infeed points 17, 28, 29 are physically remote from one another, with the result that the wind conditions differ from one another. The control unit 19 receives prediction data for all of the wind energy installations 14, 15 and attempts to identify a favorable maintenance time period 26 for the maintenance of the first wind energy installation 15. For example, a maintenance time period in which the wind energy installations 14, 15 connected to the first network infeed point 17 are exposed to a wind speed that is lower than the rated wind speed would be favorable. The power loss to be expected due to the shutdown of the first wind energy installation 15 is then lower than the rated power of the first wind energy installation 15. At the same time, the wind speed at the wind energy installations 14 connected to the second network infeed point 28 could be greater than the rated wind speed, with the result that a sufficient amount of boost power is available in order to compensate for the power loss at the first wind energy installation 15.

It is then possible to determine a maintenance time period 26 in which the maintenance process is carried out at the first wind energy installation 15 and the power loss is compensated by boost power from the wind energy installations 14 connected to the second network infeed point 28. This is independent of what the wind conditions are like at the wind energy installations 14 connected to the third infeed point 29. If it were calm there such that all of the wind energy installations 14 connected to the third network infeed point 29 are at a standstill, this would not change anything about the fact that the power loss can be compensated by the first wind energy installation 15 by means of boost power provided at the second network infeed point 28. Other designs in which, for example, boost power is fed in via both network infeed points 28, 29 or only via the third network infeed point 29 are also possible.

Figure 4:
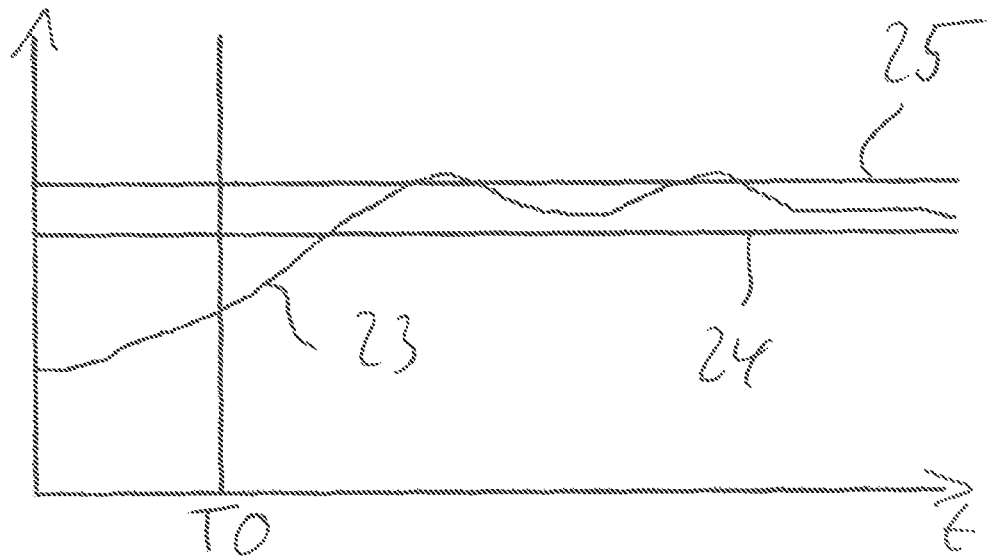
FIGS. 4 and 5 show the view according to FIG. 2 at different times.
Figure 5:
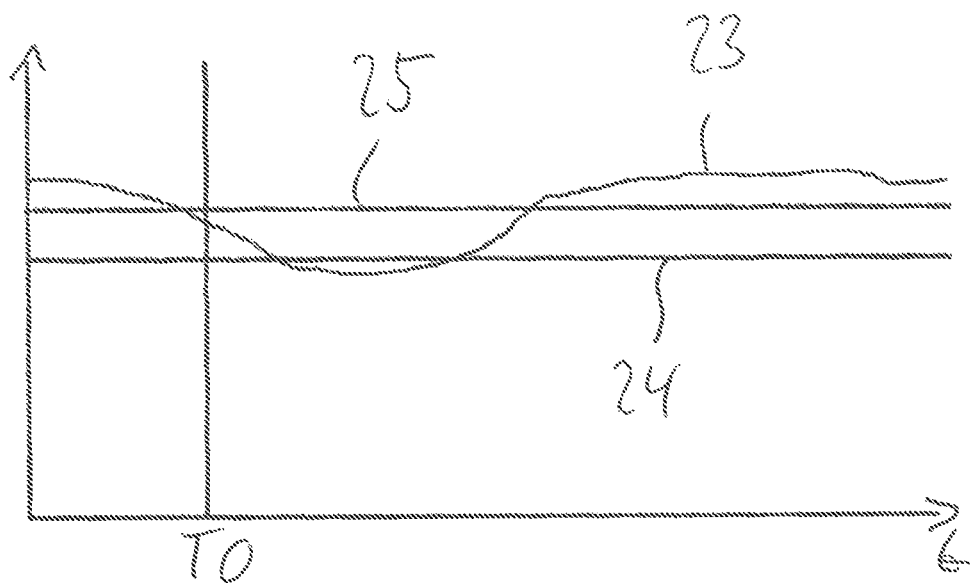

FIGS. 4 and 5 illustrate two examples in which the control unit 15 a maintenance time period 26 cannot be determined based on the prediction data available at the time T0. In FIG. 4, although the threshold value 25 is exceeded twice, the respective time period is shorter than the period of time necessary for the maintenance process at the first wind energy installation 15. In FIG. 5, although the time period in which the threshold value 25 is exceeded is long enough, such a high turbulence (or another measurement value having an influence on the loading of the wind energy installation) is predicted, for example, that the wind energy installations 14 would be loaded to too great an extent through the drawing of boost power. In both cases, the maintenance time period 26 is determined at a later time at which the prediction data are more favorable.

The invention claimed is:

1. A method for the maintenance of a first wind energy installation (15) from a group of wind energy installations (14, 15) comprising the following steps:
   a. identifying a future maintenance time period (26) in which a boost power of the group of wind energy installations (14, 15) is greater than a prescribed threshold value, wherein the boost power results from a wind speed (23) predicted for the future maintenance time period (26), said wind speed being greater than a rated wind speed (24);
   b. reducing the power of the first wind energy installation (15) after the start of the maintenance time period and drawing a boost power from a plurality of wind energy installations (14) from the group of wind energy installations (14, 15);
   c. carrying out a maintenance process at the first wind energy installation (15).

2. The method of claim 1, wherein a future maintenance time period (26) is identified in which the predicted environmental conditions at at least one wind energy installation (15) are more favorable than the standard conditions assumed in the design of the wind energy installation (15) and in that the boost power is drawn from the wind energy installation (15) within a measurement range of the design.

3. The method of claim 1, wherein a future maintenance time period (26) is identified in which the predicted wind turbulence, a vertical and/or horizontal wind gradient, an upflow, a wake condition in the group of wind energy installations and/or an air density are low.

4. The method of claim 1, wherein the first wind energy installation (15) is brought to a standstill after the start of the maintenance time period (26).

5. The method of claim 1, wherein between a time (T0) at which the future maintenance time period (26) is identified and the start of the maintenance time period (26), a maintenance plan is created, which determines a maintenance process to be carried out in the future maintenance time period (26) for the first wind energy installation (15).

6. The method of claim 1, wherein the prescribed threshold value for the boost power is related to the power loss to be expected in the first wind energy installation (15) during the maintenance time period (26).

7. The method of claim 6, wherein the prescribed threshold value is selected so that it corresponds to at least 40%, preferably at least 80%, further preferably at least 100% of the power loss to be expected at the first wind energy installation (15).

8. The method of claim 1, wherein the future maintenance time period (26) is identified in which the power loss of the first wind energy installation (15) to be expected is lower than the rated power of the first wind energy installation (15).

9. The method of claim 1, wherein the future maintenance time period (26) is selected so that the boost power is greater than the prescribed threshold value over at least 40%, preferably over at least 60%, further preferably over at least 80% of the duration of the maintenance process.

10. The method of claim 1, wherein the first wind energy installation (15) is connected to a transmission network (18) via a first network infeed point (17) and in that the group comprises wind energy installations (14) that are connected to a transmission network (18) via a second network infeed point (28, 29).

11. The method of claim 10, wherein the permissible power that can be fed in via the second network infeed point (28, 29) is greater by an excess power than the sum of the rated powers of the wind energy installations (14) connected to the second network infeed point (28, 29).

12. A control unit for carrying out a maintenance process at a first wind energy installation (15) from a group of wind energy installations (14, 15), wherein the control unit (19) identifies, based on a wind prediction, a future maintenance time period (26) in which a boost power of the group of wind energy installations (14, 15) is greater than a prescribed threshold value, wherein the control unit (19) is designed to generate a control signal after the start of the maintenance time period (26) in order to reduce the power of the first wind energy installation (15) and to draw a boost power from a plurality of wind energy installations (14) from the group of wind energy installations (14, 15).

* * * * *